(12) United States Patent
Williams et al.

(10) Patent No.: US 11,628,713 B2
(45) Date of Patent: Apr. 18, 2023

(54) ELECTRIC VEHICLE POWERTRAIN ASSEMBLY HAVING NESTED SHAFTS

(71) Applicant: Rivian IP Holdings, LLC, Plymouth, MI (US)

(72) Inventors: Cameron Philip Williams, Dexter, MI (US); Mason Verbridge, Canton, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 72 days.

(21) Appl. No.: 16/892,501

(22) Filed: Jun. 4, 2020

(65) Prior Publication Data

US 2021/0379977 A1 Dec. 9, 2021

(51) Int. Cl.
*B60K 8/00* (2006.01)
*B60K 1/02* (2006.01)
*B60K 17/356* (2006.01)
*B60K 7/00* (2006.01)
(Continued)

(52) U.S. Cl.
CPC ............... *B60K 1/02* (2013.01); *B60K 17/356* (2013.01); *B60K 2007/0092* (2013.01); *B60K 2023/043* (2013.01); *B60K 2026/043* (2013.01)

(58) Field of Classification Search
CPC ........ B60K 1/02; B60K 17/00; B60K 17/356; B60K 17/043; B60K 17/24; B60K 17/04; B60K 17/34; B60K 7/0007; B60K 2007/0092; B60K 2007/0046;
(Continued)

(56) References Cited

U.S. PATENT DOCUMENTS 5,419,406 A * 5/1995 Kawamoto ............... B60K 1/02
475/5
5,558,589 A * 9/1996 Schmidt ................... B60K 6/48
903/910
(Continued)

FOREIGN PATENT DOCUMENTS

DE    10 2009 013871    9/2010
DE    10 2012 112973    6/2014
(Continued)

OTHER PUBLICATIONS

U.S. Appl. No. 16/892,504, filed Jun. 4, 2020, Cameron Philip Williams.

*Primary Examiner* — James M Dolak
(74) *Attorney, Agent, or Firm* — Haley Guiliano LLP

(57) ABSTRACT

A drivetrain system includes a first drive gear driven by a first motor and a second drive gear driven by a second motor. The first drive gear and the second drive gear are arranged along the axis. The first drive gear includes a first extension and the second drive gear includes a second extension arranged radially within and axially overlapping the first extension. The drivetrain system includes a system of bearings arranged between the first drive gear and the second drive gear, either drive gear and a stationary component, or a combination thereof. In some embodiments, the drivetrain system includes a clutch assembly arranged between the first drive gear and the second drive gear that interfaces to the first drive gear and to the second drive gear. The clutch assembly allows the drive gears to be locked or otherwise engaged to improve torque transfer.

7 Claims, 10 Drawing Sheets

(51) Int. Cl.
*B60K 23/04* (2006.01)
*B60K 26/04* (2006.01)

(58) Field of Classification Search
CPC ...... B60K 2007/0061; B60K 2026/043; B60K 2023/043
See application file for complete search history.

(56) References Cited

U.S. PATENT DOCUMENTS

| | | | | |
|---|---|---|---|---|
| 5,751,081 | A * | 5/1998 | Morikawa | B60K 17/16 475/284 |
| 6,321,865 | B1 * | 11/2001 | Kuribayashi | B60K 6/365 903/910 |
| 7,326,141 | B2 * | 2/2008 | Lyons | B62D 11/16 180/6.7 |
| 8,155,834 | B2 * | 4/2012 | Murahashi | B60W 10/30 184/26 |
| 8,336,655 | B2 * | 12/2012 | Knoblauch | B60K 1/02 477/3 |
| 8,632,434 | B2 * | 1/2014 | Kira | B60W 10/18 475/249 |
| 8,641,568 | B2 * | 2/2014 | Knoblauch | B60K 7/0007 310/90 |
| 8,678,118 | B2 | 3/2014 | Takenaka et al. | |
| 8,960,341 | B2 * | 2/2015 | Weber | H02K 7/006 180/65.6 |
| 9,140,335 | B2 * | 9/2015 | Knoblauch | B60K 17/046 |
| 9,150,090 | B2 * | 10/2015 | Hiyoshi | B60K 1/02 |
| 9,592,732 | B2 * | 3/2017 | Frohnmayer | B60K 17/08 |
| 9,951,850 | B2 * | 4/2018 | Kramer | F16H 57/0494 |
| 10,207,572 | B2 * | 2/2019 | Makino | B60K 7/0007 |
| 10,259,318 | B2 * | 4/2019 | Frohnmayer | B60K 7/0007 |
| 10,384,535 | B2 * | 8/2019 | Isono | B60K 17/046 |
| 10,493,978 | B2 * | 12/2019 | Haupt | B60W 10/10 |
| 10,556,617 | B2 * | 2/2020 | Wang | B62D 5/0424 |
| 10,703,201 | B2 * | 7/2020 | Bassis | B60K 7/0007 |
| 10,710,462 | B2 * | 7/2020 | Yamaguchi | B60L 15/2036 |
| 11,110,805 | B2 * | 9/2021 | Hirata | B60K 1/02 |
| 11,155,161 | B2 * | 10/2021 | Makino | F16H 57/021 |
| 11,173,781 | B2 * | 11/2021 | Mock | B60K 6/54 |
| 11,198,357 | B2 * | 12/2021 | Reimnitz | H02K 7/108 |
| 11,198,359 | B2 * | 12/2021 | Payne | B60K 7/0007 |
| 11,371,588 | B1 * | 6/2022 | Ghatti | B60K 17/08 |
| 11,376,952 | B1 * | 7/2022 | Shin | B60K 17/145 |
| 11,413,946 | B2 * | 8/2022 | Absenger | H02K 5/203 |
| 11,415,208 | B2 * | 8/2022 | Engerman | F16D 25/10 |
| 11,418,086 | B2 * | 8/2022 | Smith | H02K 7/088 |
| 2012/0192664 | A1 | 8/2012 | Bridges | |
| 2014/0157954 | A1 | 6/2014 | Zettergren | |
| 2016/0229289 | A1 | 8/2016 | Frohnmayer et al. | |
| 2020/0164736 | A1 | 5/2020 | Verbridge et al. | |
| 2021/0381587 | A1 | 12/2021 | Williams et al. | |

FOREIGN PATENT DOCUMENTS

| | | |
|---|---|---|
| DE | 10 2016 103481 | 8/2017 |
| WO | WO 2017138312 | 8/2017 |

\* cited by examiner

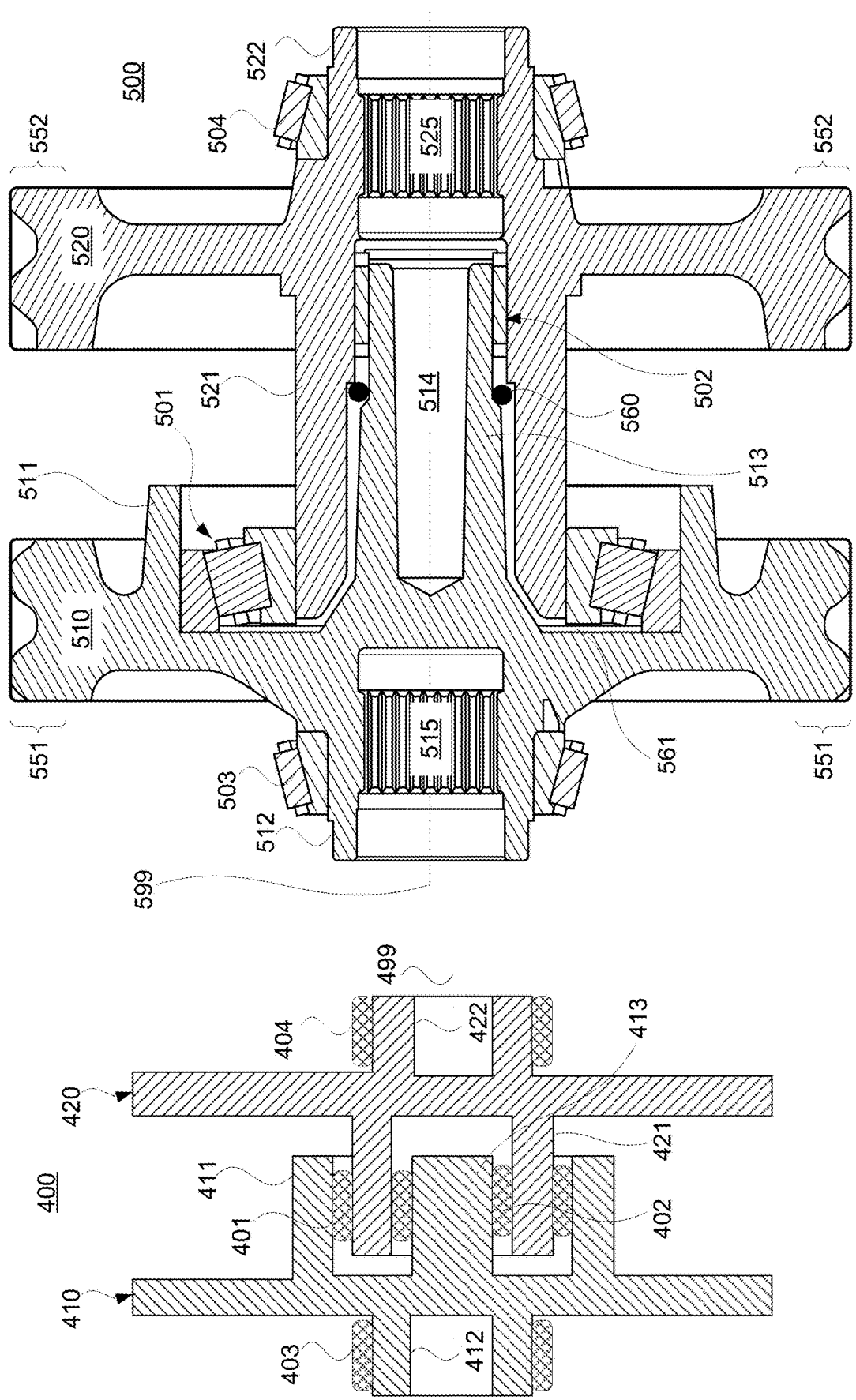

ELECTRIC VEHICLE POWERTRAIN ASSEMBLY HAVING NESTED SHAFTS

The present disclosure is directed to vehicle powertrains, and more particularly, to electric vehicle powertrains having nested components.

SUMMARY

Electric vehicles include electric powertrains. The arrangements of electric vehicle powertrains are dependent on design considerations, crash considerations, and performance considerations. It would be advantageous to provide a relatively more compact powertrain arrangement for an electric vehicle.

In some embodiments, the present disclosure is directed to drivetrains, and components thereof, that achieve a compact arrangement while allowing for torque vectoring.

The present disclosure is directed to a drivetrain system. The drivetrain system includes (i) a first drive gear arranged on an axis and driven by a first motor and (ii) a second drive gear arranged on the axis and driven by a second motor. The first drive gear includes a first extension along the axis, and the second drive gear includes a second extension along the axis. The second extension is arranged radially within and axially overlaps the first extension. In some embodiments, the drivetrain system includes one or more bearings. In some embodiments, the drivetrain system includes a clutch assembly.

In some embodiments, the drivetrain system includes a bearing arranged between the first drive gear and the second drive gear that interfaces to the first extension and to the second extension. In some embodiments, the bearing includes a taper roller bearing for transmitting axial force between the first drive gear and the second drive gear. In some embodiments, the bearing is a first bearing and the first drive gear includes a third extension radially outside of the second extension. In some such embodiments, the drivetrain system includes a second bearing arranged between the first drive gear and the second drive gear that interfaces to the second extension and to the third extension. For example, in some embodiments, the second bearing is a roller bearing. In some embodiments, a second bearing is arranged between the first drive gear and a component that is stationary, such as a housing.

In some embodiments, the first drive gear includes a third extension extending axially opposite of the first extension, and the second drive gear comprises a fourth extension extending axially opposite of the second extension. For example, in some such embodiments, the drivetrain system includes a further bearing interfacing to the third extension and a still further bearing interfacing to the fourth extension. To illustrate, these further bearings may include tapered roller bearings arranged outboard of both the first and second drive gears.

In some embodiments, the second extension includes a recess for holding lubricating grease. In some embodiments, the drivetrain system includes a seal interfacing with the first drive gear and with the second extension to at least partially seal the recess.

In some embodiments, the bearing is configured to not rotate relative to the first drive gear when the first drive gear and the second drive gear rotate at the same rotational speed.

In some embodiments, a drivetrain system includes a first drive train, a second drive, and one or more bearings. The first drivetrain includes a first electric motor having a motor shaft and a first motor gear, a first intermediate shaft engaged with the first motor gear, and a first drive gear engaged with the first intermediate shaft. The second drivetrain includes a second electric motor having a motor shaft and a second motor gear, a second intermediate shaft engaged with the second motor gear, and a second drive gear arranged coaxially with the first drive shaft and partially overlapping axially with the first drive gear forming a first region. In some embodiments, the bearing is arranged between the first drive gear and the second drive gear in the first region, and interfaces to the first drive gear and to the second drive gear. In some embodiments, the second drive gear is engaged with the second intermediate shaft.

In some embodiments, the bearing includes a taper roller bearing for transmitting axial force between the first drive gear and the second drive gear.

In some embodiments, the first drive gear includes a first extension, the second drive gear includes a second extension, and the first extension and the second extension form the first region. For example, the bearing interfaces to the first extension and to the second extension.

In some embodiments, the bearing is a first bearing, and the first drive gear includes a third extension radially outside of the second extension. In some such embodiments, the drivetrain system includes a second bearing arranged between the second extension and the third extension.

In some embodiments, the bearing is a first bearing, and the drivetrain system includes a second bearing arranged between the first drive gear and a component that is stationary, such as a housing.

In some embodiments, the second extension of the second drive gear includes a recess for holding lubricating grease. In some embodiments, the drivetrain system includes a seal interfacing with the first drive gear and with the second extension to at least partially seal the recess.

In some embodiments, the bearing is configured to not rotate relative to the first drive gear when the first drive gear and the second drive gear rotate as the same rotational speed.

In some embodiments, the first intermediate shaft includes a first intermediate gear, the second intermediate shaft includes a second intermediate gear, and the first intermediate gear and the second intermediate gear partially overlap axially.

In some embodiments, the drivetrain system includes a first drive gear, a second drive gear, and a clutch assembly. The first drive gear is arranged on an axis, is driven by a first motor, and includes a first extension along the axis. The second drive gear is arranged on the axis, is driven by a second motor, and includes a second extension along the axis. The second extension is arranged radially within and axially overlaps the first extension. The clutch assembly is arranged between the first drive gear and the second drive gear, and is affixed to a housing of the drivetrain system. The clutch assembly interfaces to the first extension and to the second extension.

In some embodiments, the clutch assembly includes a first clutch element affixed to the first drive gear, a second clutch element affixed to the second drive gear, and an actuator for engaging the first clutch element and the second clutch element. For example, in some embodiments, the first clutch element is affixed to the first extension and the second clutch element is affixed to the second extension. In a further example, in some embodiments, the first extension includes one or more features for affixing the first clutch element. In a further example, in some embodiments, the second extension incudes one or more features for affixing the second clutch element. Features may include splines, keyways, steps, any other suitable features, or any combination thereof.

In some embodiments, the second drive gear incudes a third extension arranged radially inside of the second extension. In some such embodiments, the drivetrain system includes a bearing engaged with the second extension and the third extension.

In some embodiments, the first drive gear includes at least one passage extending axially through the first drive gear to allow lubricant to flow axially through the first drive gear.

In some embodiments, the drivetrain system includes a bearing arranged between and engaged with the first drive gear and the second drive gear. In some embodiments, the drivetrain system includes a bearing arranged between and engaged with a component that is stationary, such as the housing, and one of the first drive gear or the second drive gear.

In some embodiments, when the clutch assembly is engaged, the first drive gear and the second drive gear apply a respective torque on each other to reduce a difference in rotational speed between the first drive gear and second drive gear. For example, the clutch assembly may lock up the first drive gear and the second drive gear to rotate at the same rotational speed.

In some embodiments, the drivetrain system includes a first drivetrain, a second drivetrain, and a clutch assembly. The first drivetrain includes a first electric motor having a motor shaft and a first motor gear, a first intermediate shaft engaged with the first motor gear, a first drive gear engaged with the first intermediate shaft, and a first housing configured to cover the first motor gear, the first intermediate gear, and the first drive gear. The second drivetrain includes a second electric motor having a motor shaft and a second motor gear, a second intermediate shaft engaged with the second motor gear, a second drive gear arranged coaxially with the first drive gear and partially overlapping axially with the first drive gear forming a first region. The second drive gear is engaged with the second intermediate shaft. The second drive unit also includes a second housing configured to cover the second motor gear, the second intermediate gear, and the second drive gear. The drivetrain system also includes a third housing affixed between the first housing and the second housing. The drivetrain system further includes a clutch assembly arranged between the first drive gear and the second drive gear. The clutch assembly is affixed to the third housing of the drivetrain system and interfaces to the first drive gear and to the second drive gear.

In some embodiments, the clutch assembly includes a first clutch element affixed to the first drive gear, a second clutch element affixed to the second drive gear, and an actuator for engaging the first clutch element and the second clutch element.

In some embodiments, the first drive gear includes a first extension that axially overlaps at least part of the second drive gear, and the first clutch element is affixed to the first extension. In some such embodiments, the first extension includes one or more features for affixing the first clutch element. In some embodiments, the second drive gear includes a second extension radially inside of the first extension and is at least partially affixed to the second extension. In some such embodiments, the second drive gear includes one or more features for affixing the second clutch element.

In some embodiments, the first drive gear includes at least one passage extending axially through the first drive gear to allow lubricant to flow axially through the first drive gear.

In some embodiments, the drivetrain system includes a bearing arranged between and engaged with the first drive gear and the second drive gear.

In some embodiments, the drivetrain system includes a bearing arranged between and engaged with a third housing and one of the first drive gear or the second drive gear, and the third housing is arranged axially between the first housing and the second housing.

In some embodiments, when the clutch assembly is engaged, the first drive gear and the second drive gear apply a respective torque on each other to reduce a difference in rotational speed between the first drive gear and second drive gear.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 4 shows a cross-sectional view of an illustrative bearing arrangement for nested drive gears, in accordance with some embodiments of the present disclosure;

FIG. 5 shows a cross-sectional view of an illustrative drive system having nested drive gears and bearings, in accordance with some embodiments of the present disclosure;

DETAILED DESCRIPTION

Figure 1:
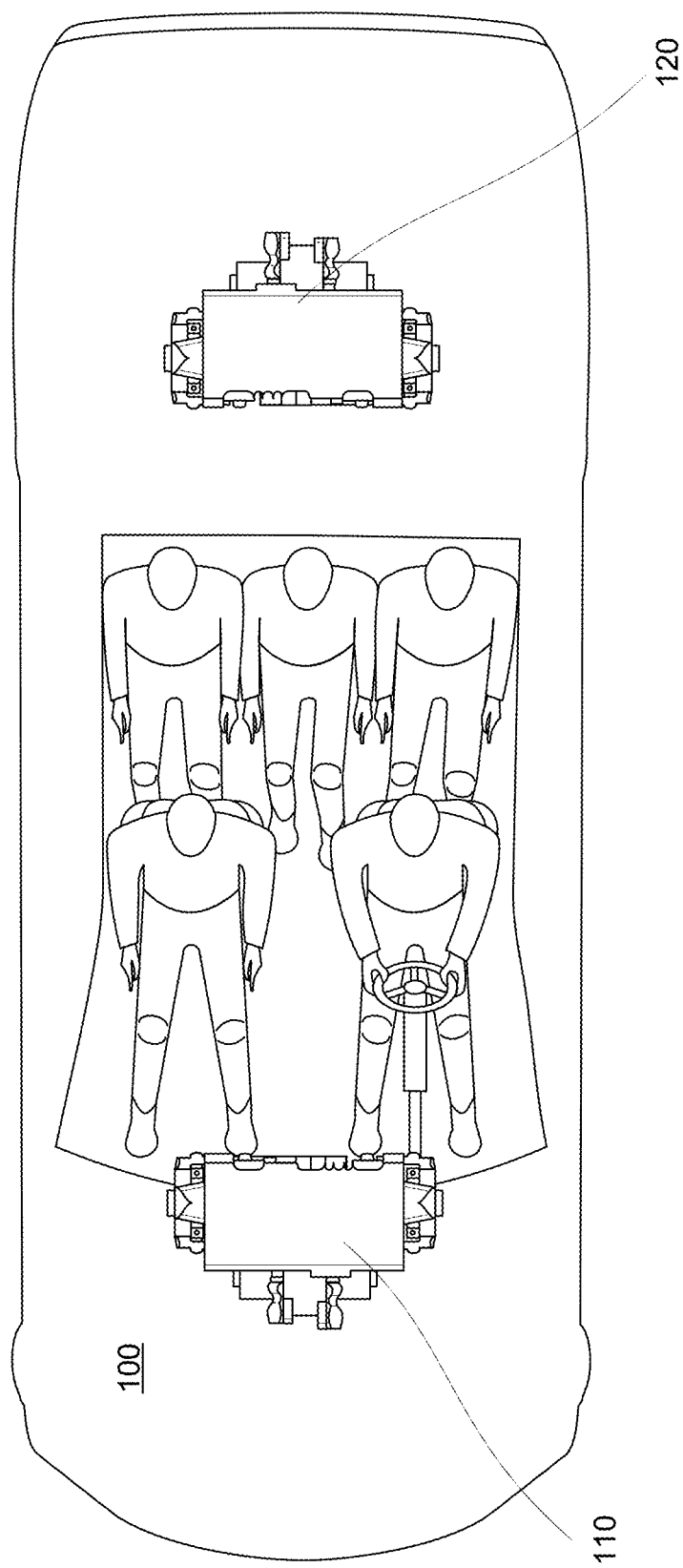
FIG. 1 shows a top view of illustrative components of an electric vehicle, in accordance with some embodiments of the present disclosure.

In some embodiments, an electric drivetrain may include one or more electric motors configured to achieve torque vectoring (e.g., a two-motor or four-motor architecture). For example, a vehicle may include a front drive unit and a rear drive unit that each include respective motors, independent gearsets integrated into a compact and cost-efficient package. In some embodiments, the present disclosure is directed to assemblies having nested gears driven by independent motors. In some embodiments, the present disclosure is directed to drive trains that include clutches for coupling the drive gears.

A drive system may be configured to provide a mode of independent speed and torque control, a mode of providing additional torque for off-road events and to prevent thermal overload during extended high torque events, or both. In some embodiments, a compact and integrated locking system is included to lock the outputs such that torque of two electric motors can be transferred to one output shaft.

The drive system may include a shaft and hub system, with output shafts that may be disengaged for independent control of each output by a single motor, or may be locked together so both output shafts are driven by both motors. In some embodiments, the two output shaft members (e.g., the drive gears) are nested in an arrangement that allows for a compact package, reduced number of bearings, and high mechanical efficiency while optionally providing sufficient power-flow to connect to a clutch device that engages the two outputs. In an illustrative example, the clutch assembly may be coupled using a splined interface, fastener interface, or by an integrated feature in the shaft. The clutch may include a torque-transferring device such as, for example, a friction surface, a sprag, a roller, a movable spline such as a dog clutch or face clutch, any other suitable components or clutch types, or any combination thereof. The clutch system couples the two output shaft members under actuation by a mechanical, hydraulic or electromechanical actuator, for example.

In some embodiments, the nested shafts of the drive system are supported by bushings, bearings, or both that are configured and arranged to accommodate loads and reaction forces. The nested configuration and connections of the shafts allow the bushing or bearing members to be reduced or minimized in quantity. Further, in some embodiments, the location and kinematics of the configuration reduce or eliminate differential motion between the drive gears during normal operation to reduce power losses of the bearings and provide a higher efficiency design than a separate shaft configuration. In some embodiments, the nested shafts and any connection to the clutch assembly, along with the supporting bearings, provides independent shaft power-flow and allows for the connection of a locking mechanism.

In some embodiments, the drive systems of the present disclosure allow for improved off-road capability and thermal capability of a vehicle, for longer duration, high-load events. Further, the drive systems of the present disclosure allow for compact packaging (e.g., width, diameter), desired mechanical efficiency, and relatively low complexity.

FIG. 1 shows a top view of illustrative components of electric vehicle 100, in accordance with some embodiments of the present disclosure. In some embodiments, a vehicle may include two or more electric motors (e.g., four motors), arranged in one or more drive units. For example, some of the motor assemblies may be identical, while some may have different handedness or shaft rotation direction relative to the motor. As illustrated, electric vehicle 100 includes front drive unit 110 and rear drive unit 120. Front drive unit 110 and rear drive unit 120 may each include two motor drivetrains, which each include a motor, a gearset, bearings, and output interface. For example, the drivetrains of the present disclosure may be included in either or both of front drive unit 110 and rear drive unit 120.

Figure 2:
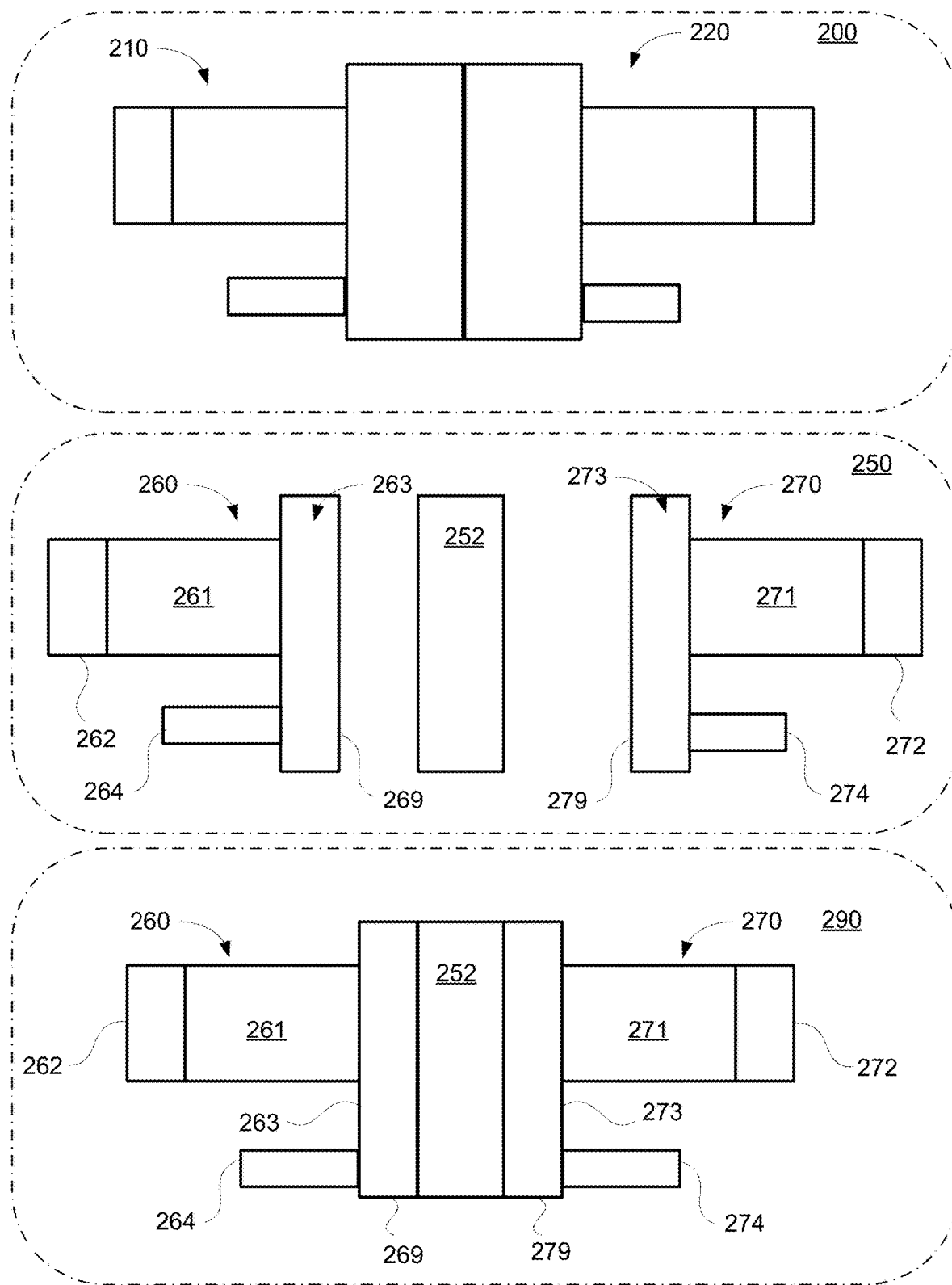
FIG. 2 shows three illustrative drive unit configurations, in accordance with some embodiments of the present disclosure.

FIG. 2 shows three illustrative drive unit configurations, in accordance with some embodiments of the present disclosure. Configuration 200 includes two separate motor drives 210 and 220, each capable of operating as a single drive. Each of motor drive 210 and 220 may be, for example, sealed, mechanically separate (e.g., complete bearings and lubrication systems), and include a motor, gearbox, and output (e.g., an output spline or output half-shaft).

Configuration 250 includes motor drives 260 and 270, illustrated in an exploded view (e.g., unassembled). Motor drives 260 and 270 are configured to be coupled together by intermediate housing 252. In some embodiments, each of motor drives 260 and 270 may include one or more housings (e.g., housings 262, 272, 269, and 279), a motor (e.g., motors 261 and 271), a gearset (e.g., gearsets 263 and 273), and an output (e.g., half-shafts 264 and 274). As illustrated, motor drives 260 and 270 include, respectively, housings 262 and 272, which may be configured to house a bearing, manage electrical terminations, provide cooling, provide mounting, any other suitable functions, or any suitable combination thereof. In some embodiments, housings 269 and 279 are not separately sealed and, for example, intermediate housing 252 (e.g., I-shield) may be configured to seal against both of housings 269 and 279. Intermediate housing 252 may be configured to seal lubricant (e.g., bearing oil), seal coolant (e.g., water, mixtures, oil), provide noise reduction (e.g., attenuate gear-induced audible noise and vibration), align motor drives 260 and 270 to each other, mount motor drives 260 and 270 to a frame or other structural element, house one or more shaft bearings (e.g., one or more bearings for a motor shaft, intermediate shaft, output shaft, or a combination thereof), act as a mount for a clutch assembly, any other suitable functionality, or any suitable combination thereof.

Configuration 290 includes motor drives 260 and 270 in an assembled state. For example, housings 269 and 279 may be affixed to intermediate housing 252 using fasteners (e.g., bolts, threaded studs and nuts), clamps, latches, mechanical interlocks, any other suitable affixments, or any combination thereof. In some embodiments, intermediate housing 252, motor drive 260, motor drive 270, or a combination thereof may include alignment features that spatially align two or more components, constrain relative motion, or both. For example, intermediate housing 252 may allow each of motor drives 260 and 270 to be shorter (e.g., along the left-right axis in FIG. 2). In a further example, configuration 290 may be shorter than configuration 200 along the left-right axis, as illustrated, because motor drives 260 and 270 need not require fully sealed gearsets 263 and 273.

Figure 3:
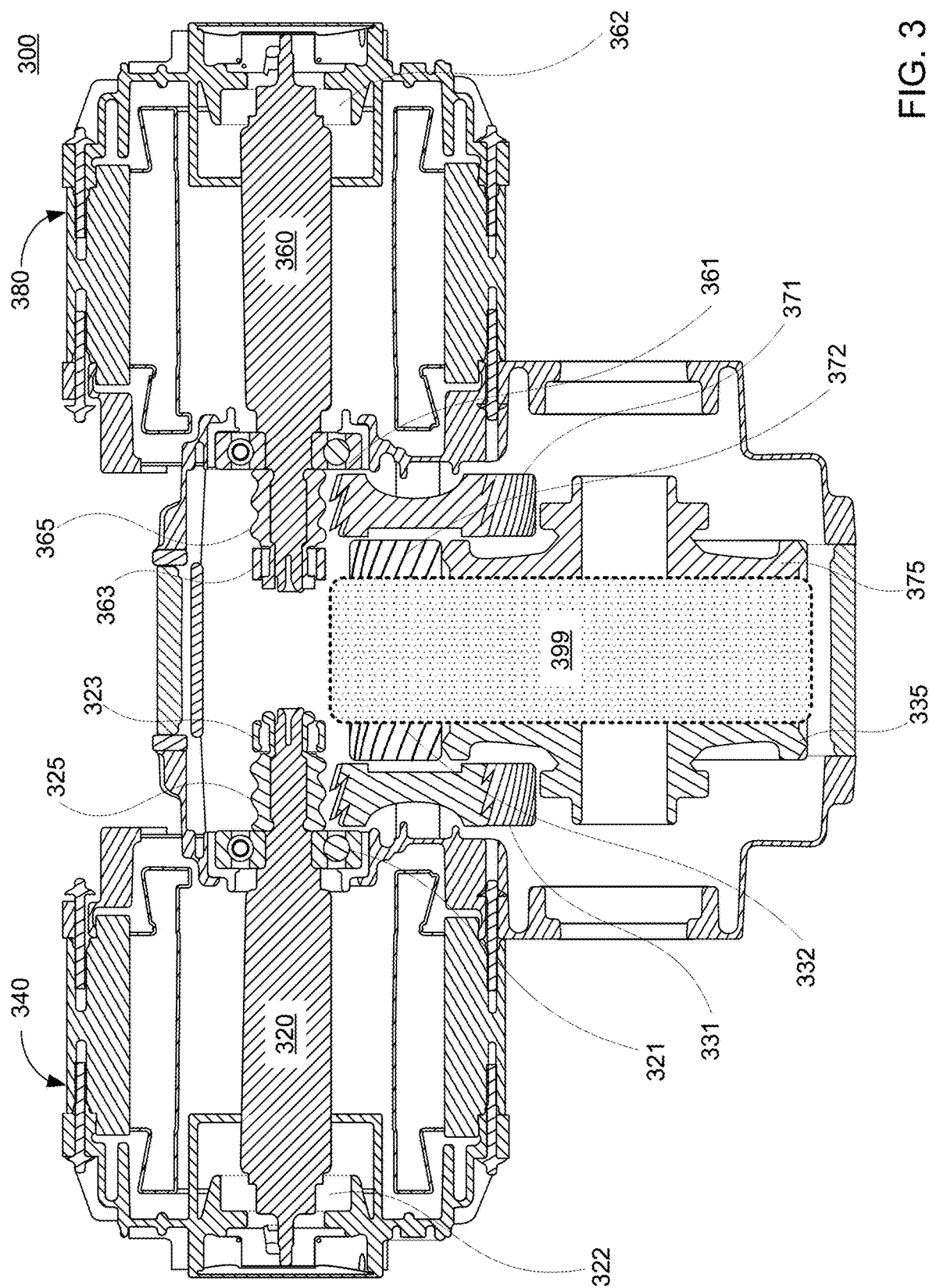
FIG. 3 shows a top cross-sectional view of an illustrative drivetrain system, in accordance with some embodiments of the present disclosure.

FIG. 3 shows a top cross-sectional view of illustrative drivetrain system 300, in accordance with some embodiments of the present disclosure. Motors 340 and 380 include respective motor shafts 320 and 360, to which respective motor gears 325 and 365 are affixed. Each of motor shafts 320 and 360 is positioned by three bearings: an outer bearing (not shown), a mid-bearing (e.g., bearing 321 and bearing 361, respectively), and an inner bearing (e.g., bearing 323 and bearing 363, respectively). Motor gears 325 and 365 engage with respective wheel gears 331 and 371 affixed to respective intermediate shafts (not shown). Also affixed to the respective intermediate shafts are respective pinion gears 332 and 372. Each intermediate shaft is arranged in a respective position by a respective bearing system (e.g., an inner bearing and an outer bearing). For example, an inner bearing of each intermediate shaft may be captured by an intermediate housing (e.g., mounted to, aligned to or both). Each of pinion gears 332 and 372 engages respective drive gears 335 and 375 affixed to a respective drive shaft. Each of drive gears 335 and 375 is positioned by one or more respective tapered bearings, which may be configured to react axial loads. For example, the axial loads may arise from a drive shaft (not shown) coupled to the respective drive gear. Region 399 includes the inner bearings of the intermediate and drive gears, for which illustrative examples are provided in FIGS. 4-13. In some embodiments, wheel gears 331 and 371 may be positioned axially adjacent to, or overlapping with, the respective motor (e.g., motor 340 or 380), depending upon the size of the motor gear (e.g., motor gear 325 and 365) and mid bearing (e.g., bearings 321 and 361).

FIG. 4 shows a cross-sectional view of an illustrative bearing arrangement for nested drive gears, in accordance with some embodiments of the present disclosure. Arrangement 400, as illustrated, represents a portion of a drivetrain and includes drive gear 410 (e.g., having extensions 411, 412, and 413), drive gear 420 (e.g., having extensions 421 and 422), and bearings 401-404. Drive gear 410 is driven by a first motor (e.g., in a similar arrangement as illustrated in FIGS. 2-3) and drive gear 420 is driven by a second motor (e.g., in a similar arrangement as illustrated in FIGS. 2-3). Bearings 401-404 maintain alignment of drive gears 410 and 420 along axis 499 during rotation and loading (e.g., axial loading, radial loading, and azimuthal loading). As illustrated, extension 421 of drive gear 420 nests radially within extension 411 of drive gear 410.

Bearing 401-404 may include, for example, roller bearings, needle bearings, ball bearings, taper bearings, thrust bearings, any other suitable type of bearing, or any combination thereof. For example, in some embodiments, bearing 403, bearing 404, and bearing 401 may include taper bearings and bearing 402 may include a needle bearing (e.g., as illustrated in FIG. 5). In some embodiments, bearings 403 and 404 are configured to react against a stationary component (e.g., a housing or other component) to maintain alignment of drive gears 410 and 420 relative to the stationary component.

As illustrated, extension 411 overlaps axially with extension 421, which is arranged radially within extension 411. Note that the radial direction in FIG. 4 is normal to axis 499 (e.g., in a direction extending from axis 499 outward). Because of the axial overlap of drive gears 410 and 420, bearing 401 may be configured to transmit forces in the radial direction, axial direction, or both, between drive gears 410 and 420. Similarly, as illustrated, extension 421 overlaps axially with extension 413, which is arranged radially within extension 421. Because of the axial overlap of drive gears 410 and 420, bearing 402 may be configured to transmit forces in the radial direction, axial direction, or both, between drive gears 410 and 420.

Extension 412 of drive gear 410 and extension 422 of drive gear 420 are configured to engage with respective bearings 403 and 404. Bearings 403 and 404 may also engage with (e.g., react forces against) a stationary component (e.g., a housing) to maintain alignment of drive gears 410 and 420. In some embodiments, extensions 412 and 422 are configured to be outputs, and may include output interfaces. For example, as illustrated, extensions 412 and 422 each include a recess configured to accommodate a half shaft (e.g., a splined interface to insert a half shaft to drive a respective wheel). Drive gears 410 and 420 may include any suitable output interface such as, for example, a splined interface, a keyed interface, a flanged interface (e.g., with fasteners), a universal joint, a clutched interface, any other suitable interface, or any combination thereof.

In an illustrative example, drive gears 410 and 420 may rotate about axis 499 at substantially the same speed when the vehicle is traveling straight on relatively consistent ground. During turning or under condition where one side may experience more traction or more slip, drive gears 410 and 420 may rotate at different speeds about axis 499 (e.g., drive gears 410 and 420 rotate relative to each other about axis 499). Accordingly, during straight-line driving, bearings 401 and 402 do not experience relative rotation between drive gears 410 and 420. As drive gears 410 and 420 differ in speed (e.g., one wheel slips, or a turn is made), bearings 401 and 402 experience the relative rotation between drive gears 410 and 420.

In a further illustrative example, during assembly, drive gears 410 and 420, and bearings 401-404 may be assembled, and a preload may be applied along axis 499 to bearings 403 and 404. In some embodiments, the preload also loads bearing 401, bearing 402 or both to the extent they include tapered bearings. To illustrate, because bearings 401 and 402 engage with drive gears 410 and 420 and not stationary components, in some embodiments, a single axial preload may be applied rather than a respective axial preload applied to bearings associated with each distinct drive gear.

FIG. 5 shows a cross-sectional view of an illustrative drive system 500 having nested drive gears and bearings, in accordance with some embodiments of the present disclosure. Drive system 500 is an illustrative example of arrangement 400 of FIG. 4. Drive system 500 includes drive gear 510 (e.g., having extensions 511, 512, and 513), drive gear 520 (e.g., having extensions 521 and 522), and bearings 501-504. Drive gear 510 is driven by a first motor (e.g., in a similar arrangement as illustrated in FIGS. 2-3) and drive gear 520 is driven by a second motor (e.g., in a similar arrangement as illustrated in FIGS. 2-3). In an illustrative example, the "open design" between drive gears 510 and 520 allows torque transfer and/or actuation devices to be installed and accessed radially (e.g., such as clutches or other locking devices). In a further illustrative example, bearings 501 and 502 improve stiffness to tilting for drive gears 510 and 520.

Drive gears 510 and 520 include toothed portions 551 and 552 (e.g., which may be spur, helical, or any other suitable gear type), respectively, configured to engage with corresponding toothed portions of motor gears or intermediate gears. Drive gears 510 and 520 also include output interfaces 515 and 525 (e.g., splined recesses, as illustrated), respectively, configured to engage with splined half shafts.

Bearings 501-504 maintain alignment of drive gears 510 and 520 along axis 599 during rotation and loading (e.g., axial loading, radial loading, and azimuthal loading). As illustrated, bearings 501, 503, and 504 are tapered roller bearings, and bearing 502 is a needle bearing. Bearing 501 is configured to react both axial and radial forces between drive gear 510 and drive gear 520. Bearing 502 is configured to react radial forces between drive gear 510 and drive gear 520. Extensions 511, 513, and 521 may include one or more features to engage with bearings 501 and 502 such as, for example, a step, splines, a keyway, any other suitable feature, or any combination thereof. For example, in some embodiments, an axial preload is applied to preload bearings 501, 503, and 504 in the axial direction, and such features may aid in transmitting axial preload to bearing 501. Bearings 501, 502, 503, and 504 each include races (e.g., inner and outer, which may include any suitable profile), a plurality of rollers, one or more spacers, shims, any other suitable components, or any suitable combination thereof.

In some embodiments, drive system 500 is arranged in an enclosure (e.g., formed by one or more housings), in which oil or other lubricant is supplied to reduce friction, provide cooling, or both, between relatively moving components. Because bearing 501 is relatively open to the enclosure, sufficient lubrication may be provided to bearing 501 by the lubrication system. Bearing 502 is shielded from the inside of the enclosure and thus might not receive adequate lubrication from the enclosure lubrication system. As illustrated, drive gear 510 includes recess 514 arranged in extension 513. Recess 514 is configured to be loaded with grease, which under rotation of drive gear 510 experiences centrifugal forces that push the grease into bearing 502. In some embodiments, as illustrated, O-ring 560 or other restriction is arranged between extension 513 and extension 521 to limit or prevent grease migration away from bearing 502. In some embodiment, output interface 525 is not open to interior of extension 521. In some embodiment, output interface 525 is open to interior of extension 521, although an optional plug or seal may be included to partition those regions.

In an illustrative example, during assembly, drive gears 510 and 520, and bearings 501-504 may be assembled, and a preload may be applied along axis 599 to preload bearings 501, 503, and 504 along direction 599. To illustrate, because bearing 501 engages with drive gears 510 and 520 and not stationary components, in some embodiments, a single axial preload may be applied to preload bearing 501.

Figures 6, 7:
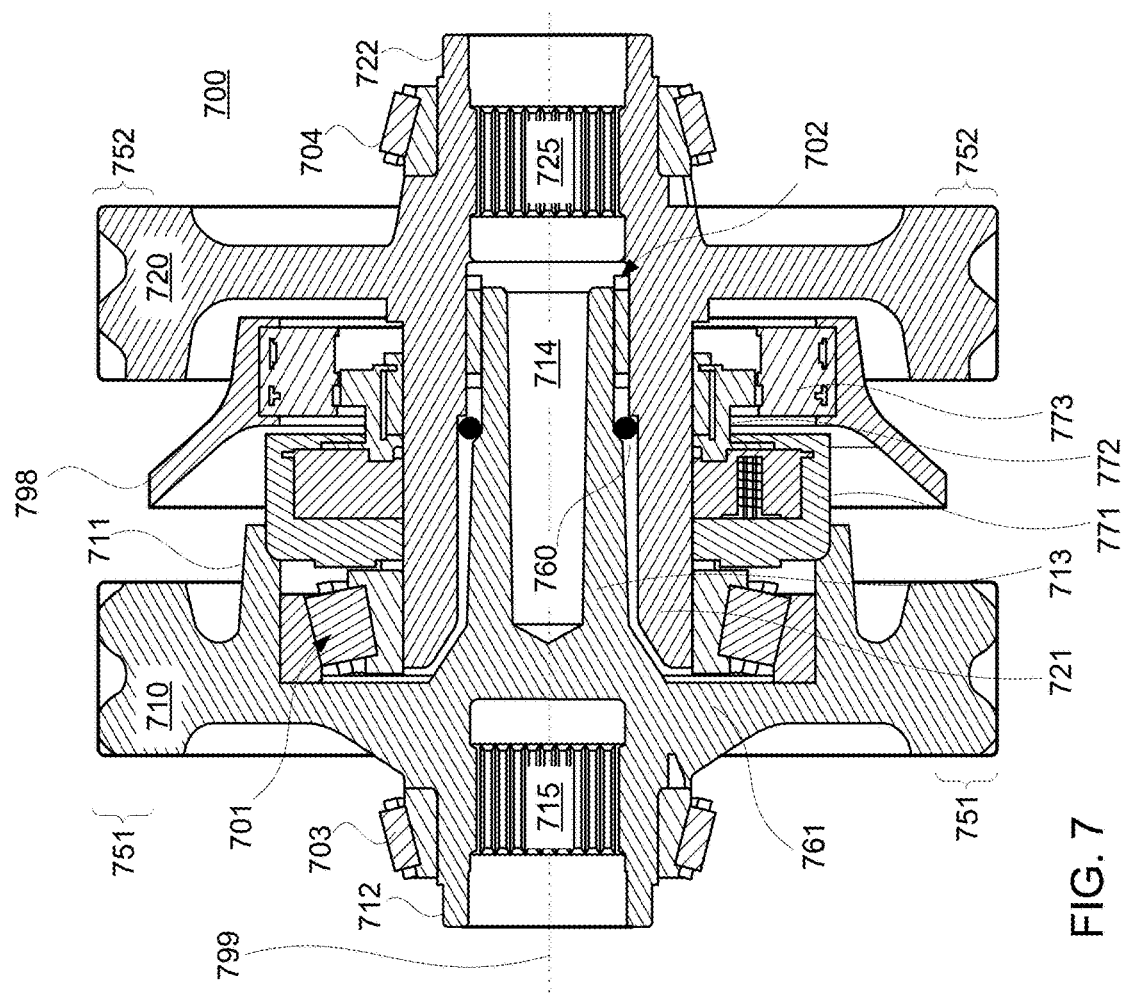
FIG. 6 shows a cross-sectional view of an illustrative bearing arrangement for nested drive gears and a clutch assembly, in accordance with some embodiments of the present disclosure.
FIG. 7 shows a cross-sectional view of an illustrative drive system having nested drive gears, bearings, and a clutch assembly, in accordance with some embodiments of the present disclosure.

FIG. 6 shows a cross-sectional view of illustrative bearing arrangement 600 for nested drive gears and a clutch assembly, in accordance with some embodiments of the present disclosure. To illustrate, arrangement 600 is similar to arrangement 400 of FIG. 4 with addition of a clutch assembly to provide engagement between drive gears 610 and 620. Arrangement 600, as illustrated, represents a portion of a drivetrain and includes drive gear 610 (e.g., having extensions 611, 612, and 613), drive gear 620 (e.g., having extensions 621 and 622), and bearings 601-604. Drive gear 610 is driven by a first motor (e.g., in a similar arrangement as illustrated in FIGS. 2-3) and drive gear 620 is driven by a second motor (e.g., in a similar arrangement as illustrated in FIGS. 2-3). Bearings 601-604 maintain alignment of drive gears 610 and 620 along axis 699 during rotation and loading (e.g., axial loading, radial loading, and azimuthal loading). As illustrated, extension 621 of drive gear 620 nests radially within extension 611 of drive gear 610, and extension 613 of drive gear 610 nests radially within extension 621 of drive gear 620. The clutch assembly, as illustrated includes clutch element 671 affixed to drive gear 610, and clutch element 672 affixed to drive gear 620. Stationary component 698, which may be part of a housing, interfaces with clutch element 671, clutch element 672, or both.

Bearings 601-604 may include, for example, roller bearings, needle bearings, ball bearings, taper bearings, thrust bearings, any other suitable type of bearing, or any combination thereof. In some embodiments, bearings 603 and 604 are configured to react against a stationary component (e.g., a housing or other component) to maintain alignment of drive gears 610 and 620 relative to the stationary component.

As illustrated, extension 611 overlaps axially with extension 621, which is arranged radially within extension 611. Because of the axial overlap of drive gears 610 and 620, bearing 601 may be configured to transmit forces in the radial direction, axial direction, or both, between drive gears 610 and 620. Similarly, as illustrated, extension 621 overlaps axially with extension 613, which is arranged radially within extension 621. Because of the axial overlap of drive gears 610 and 620, bearing 602 may be configured to transmit forces in the radial direction, axial direction, or both, between drive gears 610 and 620.

Extension 612 of drive gear 610 and extension 622 of drive gear 620 are configured to engage with respective bearings 603 and 604, which engage with a stationary component (e.g., a housing) to maintain alignment of drive gears 610 and 620. In some embodiments, extensions 612 and 622 are configured to be outputs, and may include output interfaces. For example, as illustrated, extensions 612 and 622 each include a recess configured to accommodate a half shaft. Drive gears 610 and 620 may include any suitable output interface such as, for example, a splined interface, a keyed interface, a flanged interface (e.g., with fasteners), a universal joint, a clutched interface, any other suitable interface, or any combination thereof.

The clutch assembly of bearing arrangement 600 is configured to mechanically couple drive gears 610 and 620. For example, when the clutch assembly is not engaged, drive gears 610 and 620 are driven independently, and may rotate relatively freely with respect to each other. Further, when the clutch assembly is engaged, drive gears 610 and 620 are constrained by friction forces to rotate at the same rotational speed, or otherwise impart azimuthal forces on each other (e.g., depending on whether the clutch allows slippage). Accordingly, when the clutch assembly is engaged, power from both drivers (e.g., electric motors) may be transmitted among the outputs (e.g., the wheels). For example, if one wheel has traction and the other wheel is slipping, engagement of the clutch assembly allows power to be directed to the wheel having traction. Clutch elements 671 and 672 may include friction plates, pressure plates, actuators (e.g., hydraulic, electromechanical, mechanical), centrifugal elements, conical elements, a torque limiter, dampers, springs (e.g., to reduce chatter, to release engagement), dog clutch elements (e.g., for non-slip engagement), any other suitable elements, or any combination thereof. Clutch elements 671 and 672 may partially interface to stationary component 698, which provides a structure to transmit force. For example, a linear actuator may be used to engage the clutch assembly, and a stator of the linear actuator may be affixed to stationary component 698. In a further example, an engagement mechanism of the clutch assembly may be affixed to stationary component 698 to provide a structure against which the engagement mechanism reacts a force.

In an illustrative example, drive gears 610 and 620 may rotate about axis 699 as substantially the same speed when the vehicle is traveling straight on relatively consistent ground. During turning or under condition where one side may experience more traction or more slip, drive gears 610 and 620 may rotate at different speeds about axis 699 (e.g., drive gears 610 and 620 rotate relative to each other about axis 699). In some such circumstances, wherein one wheel experiences slip, the clutch assembly may be engaged to transmit more power to the wheel with more traction. Accordingly, during straight-line driving, bearings 601 and 602 do not experience significant relative rotation between drive gears 610 and 620. As drive gears 610 and 620 differ in speed (e.g., one wheel slips, or a turn is made), bearings 601 and 602 experience the relative rotation between drive gears 610 and 620. Accordingly, in some circumstances, the clutch assembly may be engaged when the torques or rotation speeds differ between the drive gears.

In a further illustrative example, during assembly, drive gears 610 and 620, and bearings 601-604 may be assembled, and a preload may be applied along axis 699 to bearings 603 and 604. In some embodiments, the preload also loads bearing 601, bearing 602 or both to the extent they include tapered bearings. To illustrate, because bearings 601 and 602 engage with drive gears 610 and 620 and not stationary components, in some embodiments, a single axial preload may be applied rather than a respective axial preload applied to bearings associated with each distinct drive gear.

FIG. 7 shows a cross-sectional view of illustrative drive system 700 having nested drive gears, bearings, and a clutch assembly, in accordance with some embodiments of the present disclosure. Drive system 700 is an illustrative example of arrangement 600 of FIG. 6. Drive system 700 includes drive gear 710 (e.g., having extensions 711, 712, and 713), drive gear 720 (e.g., having extensions 721 and 722), and bearings 701-704. Drive gear 710 is driven by a first motor (e.g., in a similar arrangement as illustrated in FIGS. 2-3) and drive gear 720 is driven by a second motor (e.g., in a similar arrangement as illustrated in FIGS. 2-3). In an illustrative example, bearings 701 and 702 improve stiffness to tilting for drive gears 710 and 720.

Drive gears 710 and 720 include toothed portions 751 and 752 (e.g., which may be spur, helical, or any other suitable gear type), respectively, configured to engage with corresponding toothed portions of motor gears or intermediate gears. Drive gears 710 and 720 also include output interfaces 715 and 725 (e.g., splined recesses, as illustrated), respectively, configured to engage with splined half shafts.

Bearings 701-704 maintain alignment of drive gears 710 and 720 along axis 799 during rotation and loading (e.g., axial loading, radial loading, and azimuthal loading). As illustrated, bearings 701, 703, and 704 are tapered roller bearings, and bearing 702 is a needle bearing. Bearing 701 is configured to react both axial and radial forces between drive gear 710 and drive gear 720. Bearing 702 is configured to react radial forces between drive gear 710 and drive gear 720. Extensions 711, 713, and 721 may include one or more features to engage with bearings 701 and 702 such as, for example, a step, splines, a keyway, any other suitable feature, or any combination thereof. For example, in some embodiments, an axial preload is applied to preload bearings 701, 703, and 704 in the axial direction, and such features may aid in transmitting axial preload to bearing 701. Bearings 701, 702, 703, and 704 each include races (e.g., inner and outer, which may include any suitable profile), a plurality of rollers, one or more spacers, shims, any other suitable components, or any suitable combination thereof.

In some embodiments, drive system 700 is arranged in an enclosure (e.g., formed by one or more housings that may include stationary component 798), in which oil or other lubricant is supplied to reduce friction, provide cooling, or both, between relatively moving components. Because bearing 701 is relatively open to the enclosure, sufficient lubrication may be provided to bearing 701 by the lubrication system. Bearing 702 is shielded from the inside of the enclosure and thus might not receive adequate lubrication from the enclosure lubrication system. As illustrated, drive gear 710 includes recess 714 arranged in extension 713. Recess 714 is configured to be loaded with grease, which under rotation of drive gear 710 experiences centrifugal forces that push the grease into bearing 702. In some embodiments, as illustrated, seal 760 (e.g., an O-ring) or other suitable restriction is arranged between extension 713 and extension 721 to limit or prevent grease migration away from bearing 702. In some embodiments, output interface 725 is not open to interior of extension 721. In some embodiment, output interface 725 is open to interior of extension 721, although an optional plug or seal may be included to partition those regions.

In an illustrative example, during assembly, drive gears 710 and 720, and bearings 701-704 may be assembled, and a preload may be applied along axis 799 to preload bearings 701, 703, and 704 along direction 799. To illustrate, because bearing 701 engages with drive gears 710 and 720 and not stationary components, in some embodiments, a single axial preload may be applied to preload bearing 701.

The clutch assembly includes clutch element 771, clutch element 772, and actuator 773 for engaging/disengaging the clutch. As illustrated, actuator 773 is affixed to stationary component 798 (e.g., an inward extension of an intermediate housing, as illustrated). Actuator 773 is configured to linearly actuate clutch element 772, which is affixed to drive gear 720, thus causing clutch element 772 to engage with clutch element 771, which is affixed to drive gear 710. When clutch elements 771 and 772 are engaged, drive gears 710 and 720 transmit torque to each other. For example, when the clutch assembly is not engaged, drive gears 710 and 720 are driven independently by respective motors, and may rotate relatively freely with respect to each other. Further, when the clutch assembly is engaged, drive gears 710 and 720 are constrained by friction forces to rotate at the same speed, or otherwise impart azimuthal forces (torque) on each other. Accordingly, when the clutch assembly is engaged, power from both drivers (e.g., electric motors) may be transmitted among the outputs (e.g., the wheels). For example, if one wheel has traction and the other wheel is slipping, engagement of the clutch assembly allows power to be directed to the wheel having traction. Clutch elements 771 and 772 may include friction plates, pressure plates, actuators (e.g., hydraulic, electromechanical, mechanical), centrifugal elements, conical elements, a torque limiter, dampers, springs (e.g., to reduce chatter, to release engagement), dog clutch elements (e.g., for non-slip engagement), any other suitable elements, or any combination thereof. As illustrated, for example, actuator 773 engages the clutch assembly, with a stator of actuator 773 affixed to stationary component 798. In a further example, an engagement mechanism of the clutch assembly may be affixed to stationary component 798 to provide a structure against which the engagement mechanism reacts a force.

Figure 8:
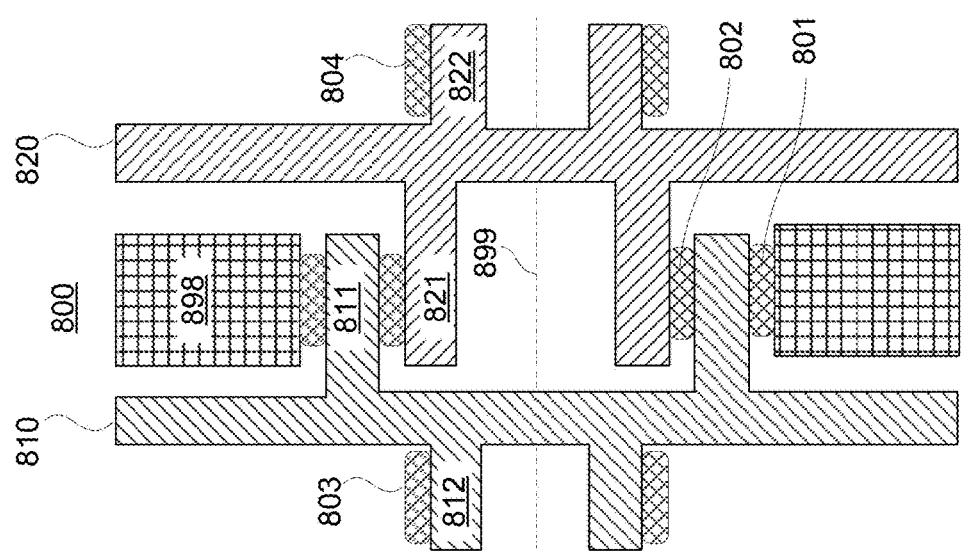
FIG. 8 shows a cross-sectional view of an illustrative bearing arrangement for nested drive gears and a stationary component, in accordance with some embodiments of the present disclosure.

FIG. 8 shows a cross-sectional view of illustrative bearing arrangement 800 for nested drive gears 810 and 820, and stationary component 898, in accordance with some embodiments of the present disclosure. Arrangement 800, as illustrated, represents a portion of a drivetrain and includes drive gear 810 (e.g., having extensions 811 and 812), drive gear 820 (e.g., having extensions 821 and 822), and bearings 801-804. Drive gear 810 is driven by a first motor (e.g., in a similar arrangement as illustrated in FIGS. 2-3) and drive gear 820 is driven by a second motor (e.g., in a similar arrangement as illustrated in FIGS. 2-3). Bearings 801-804 maintain alignment of drive gears 810 and 820 along axis 899 during rotation and loading (e.g., axial loading, radial loading, and azimuthal loading). As illustrated, extension 821 of drive gear 820 nests radially within extension 811 of drive gear 810, and extension 811 is positioned radially inside of stationary component 898.

Bearing 801-804 may include, for example, roller bearings, needle bearings, ball bearings, taper bearings, thrust bearings, any other suitable type of bearing, or any combination thereof. In some embodiments, bearings 803 and 804 are configured to react against a stationary component (e.g., a housing or other component) to maintain alignment of drive gears 810 and 820 relative to the stationary component. As illustrated, extension 811 overlaps axially with extension 821, which is arranged radially within extension 811. Because of the axial overlap of drive gears 810 and 820, bearing 802 may be configured to transmit forces in the radial direction, axial direction, or both, between drive gears 810 and 820. In an illustrative example, during assembly, drive gears 810 and 820, and bearings 801-804 may be assembled, and a preload may be applied along axis 699 to bearings 603 and 604. In some embodiments, the preload also loads bearing 801, bearing 802, or both to the extent they include tapered bearings.

Extension 812 of drive gear 810 and extension 822 of drive gear 820 are configured to engage with respective bearings 803 and 804, which engage with a stationary component (e.g., a housing) to maintain alignment of drive gears 810 and 820. In some embodiments, extensions 812 and 822 are configured to be outputs, and may include output interfaces. For example, as illustrated, extensions 812 and 822 each include a recess configured to accommodate a half shaft. Drive gears 810 and 820 may include any suitable output interface such as, for example, a splined interface, a keyed interface, a flanged interface (e.g., with fasteners), a universal joint, a clutched interface, any other suitable interface, or any combination thereof.

Figure 9:
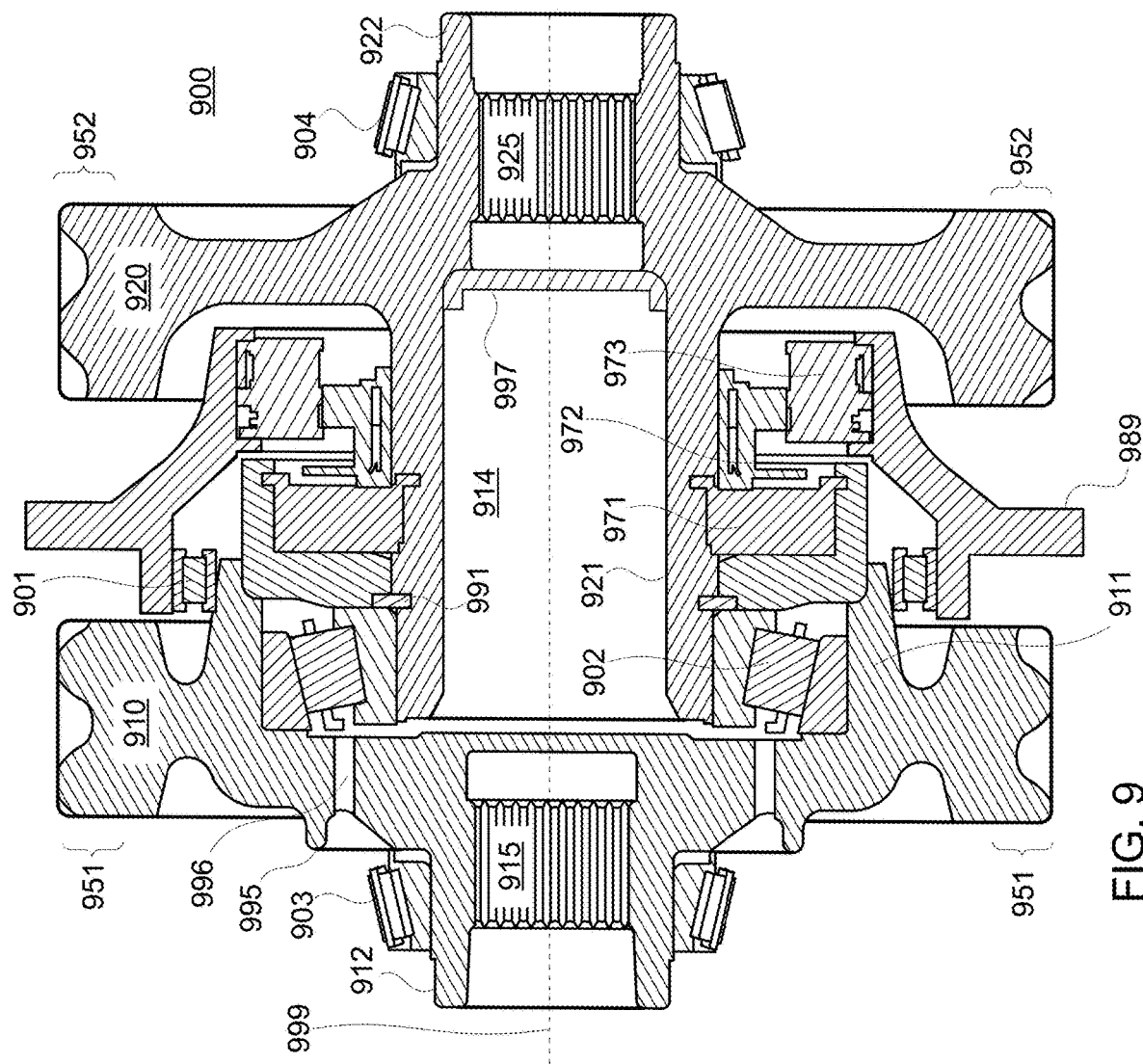
FIG. 9 shows a cross-sectional view of an illustrative drive system having nested drive gears, bearings, and a clutch assembly, in accordance with some embodiments of the present disclosure.

FIG. 9 shows a cross-sectional view of an illustrative drive system having nested drive gears, bearings, and a clutch assembly, in accordance with some embodiments of the present disclosure. Drive system 900 is an illustrative example of arrangement 800 of FIG. 8, with a clutch assembly included. Drive system 900 includes drive gear 910 (e.g., having extensions 911 and 912), drive gear 920 (e.g., having extensions 921 and 922), bearings 901-904, and a clutch assembly. Drive gear 910 is driven by a first motor (e.g., in a similar arrangement as illustrated in FIGS. 2-3) and drive gear 920 is driven by a second motor (e.g., in a similar arrangement as illustrated in FIGS. 2-3). In an illustrative example, bearings 901 and 902 improve stiffness to tilting for drive gears 910 and 920.

Drive gears 910 and 920 include toothed portions 951 and 952 (e.g., which may be spur, helical, or any other suitable gear type), respectively, configured to engage with corresponding toothed portions of motor gears or intermediate gears. Drive gears 910 and 920 also include output interfaces 915 and 925 (e.g., splined recesses, as illustrated), respectively, configured to engage with splined half shafts.

Bearings 901-904 maintain alignment of drive gears 910 and 920 along axis 999 during rotation and loading (e.g., axial loading, radial loading, and azimuthal loading). As illustrated, bearings 902, 903, and 904 are tapered roller bearings, and bearing 901 is a roller bearing. Bearing 902 is configured to react both axial and radial forces between drive gear 910 and drive gear 920. Bearing 901 is configured to react radial forces between drive gear 910 and stationary component 99. Extensions 911 and 921 may include one or more features to engage with bearing 902 such as, for example, a step, splines, a keyway, any other suitable feature, or any combination thereof. For example, in some embodiments, an axial preload is applied to preload bearings 902, 903, and 904 in the axial direction, and such features may aid in transmitting axial preload to bearing 902. Bearings 901, 902, 903, and 904 each include races (e.g., inner and outer, which may include any suitable profile), a plurality of rollers, one or more spacers, shims, any other suitable components, or any suitable combination thereof. For example, as illustrated, shim 991 is included to ensure axial loading of bearing 902 (e.g., to accommodate any tolerance stack up to ensure bearing 902 is constrained axially). In some embodiments, only a single shim is needed to provide the axial stack-up (e.g., shim 991, as illustrated). In an illustrative example, during assembly, drive gears 910 and 920, and bearings 901-904 may be assembled, and a preload may be applied along axis 999 to preload bearings 902, 903, and 904 along axis 999. To illustrate, because bearing 902 engages with drive gears 910 and 920 and not stationary components, in some embodiments, a single axial preload may be applied to preload bearing 902. As illustrated, bearing 901 is configured to react radial forces between drive gear 910 and stationary component 989. In some embodiments, bearing 902 may be reduced in size by including bearing 901 to support some radial loading.

In some embodiments, drive system 900 is arranged in an enclosure (e.g., formed by one or more housings that may include stationary component 989), in which oil or other lubricant is supplied to reduce friction, provide cooling, or both, between relatively moving components. Because bearing 901 is relatively open to the enclosure, sufficient lubrication may be provided to bearing 901 by the lubrication system. Bearing 902 is mostly shielded from the inside of the enclosure and thus might not receive adequate lubrication from the enclosure lubrication system. As illustrated, drive gear 910 includes passage 996, which is configured to allow lubricant to reach bearing 902 from the outboard side of drive gear 910. For example, lubricant may flow towards extension 995 of drive gear 910 (e.g., under centrifugal forces), and then flow into passage 996 to reach bearing 902. It will be understood that drive gear 910 may include multiple passages 996 spaced around gear 910. In some embodiment, output interface 925 is open to interior of extension 921, although as illustrated, seal 997 is included to partition those regions.

The clutch assembly includes clutch element 971, clutch element 972, and actuator 973 for engaging/disengaging the clutch. As illustrated, actuator 973 is affixed to stationary component 989 (e.g., an inward extension of an intermediate housing, as illustrated). Actuator 973 is configured to linearly actuate clutch element 972, which is affixed to drive gear 920, thus causing clutch element 972 to engage with clutch element 971, which is affixed to drive gear 910. When clutch elements 971 and 972 are engaged, drive gears 910 and 920 transmit torque to each other. For example, when the clutch assembly is not engaged, drive gears 910 and 920 are driven independently by respective motors, and may rotate relatively freely with respect to each other. Further, when the clutch assembly is engaged, drive gears 910 and 920 are constrained by friction forces to rotate at the same speed, or otherwise impart azimuthal forces (torque) on each other. Accordingly, when the clutch assembly is engaged, power from both drivers (e.g., electric motors) may be transmitted among the outputs (e.g., the wheels). For example, if one wheel has traction and the other wheel is slipping, engagement of the clutch assembly allows power to be directed to the wheel having traction. Clutch elements 971 and 972 may include friction plates, pressure plates, actuators (e.g., hydraulic, electromechanical, mechanical), centrifugal elements, conical elements, a torque limiter, dampers, springs (e.g., to reduce chatter, to release engagement), dog clutch elements (e.g., for non-slip engagement), any other suitable elements, or any combination thereof. As illustrated, for example, actuator 973 engages the clutch assembly, with a stator of actuator 973 affixed to stationary component 989. In a further example, an engagement mechanism of the clutch assembly may be affixed to stationary component 989 to provide a structure against which the engagement mechanism reacts a force. Drive gear 910 may include features (e.g., splines, flats, keyways, or other suitable features) for affixing clutch element 971. For example, extension 911 may include splines on the radially inner surface to engage clutch element 971. Drive gear 920 may include features (e.g., splines, flats, keyways, or other suitable features) for affixing clutch element 972. For example, extension 921 may include splines on the radially outer surface to engage clutch element 972.

Figure 10:
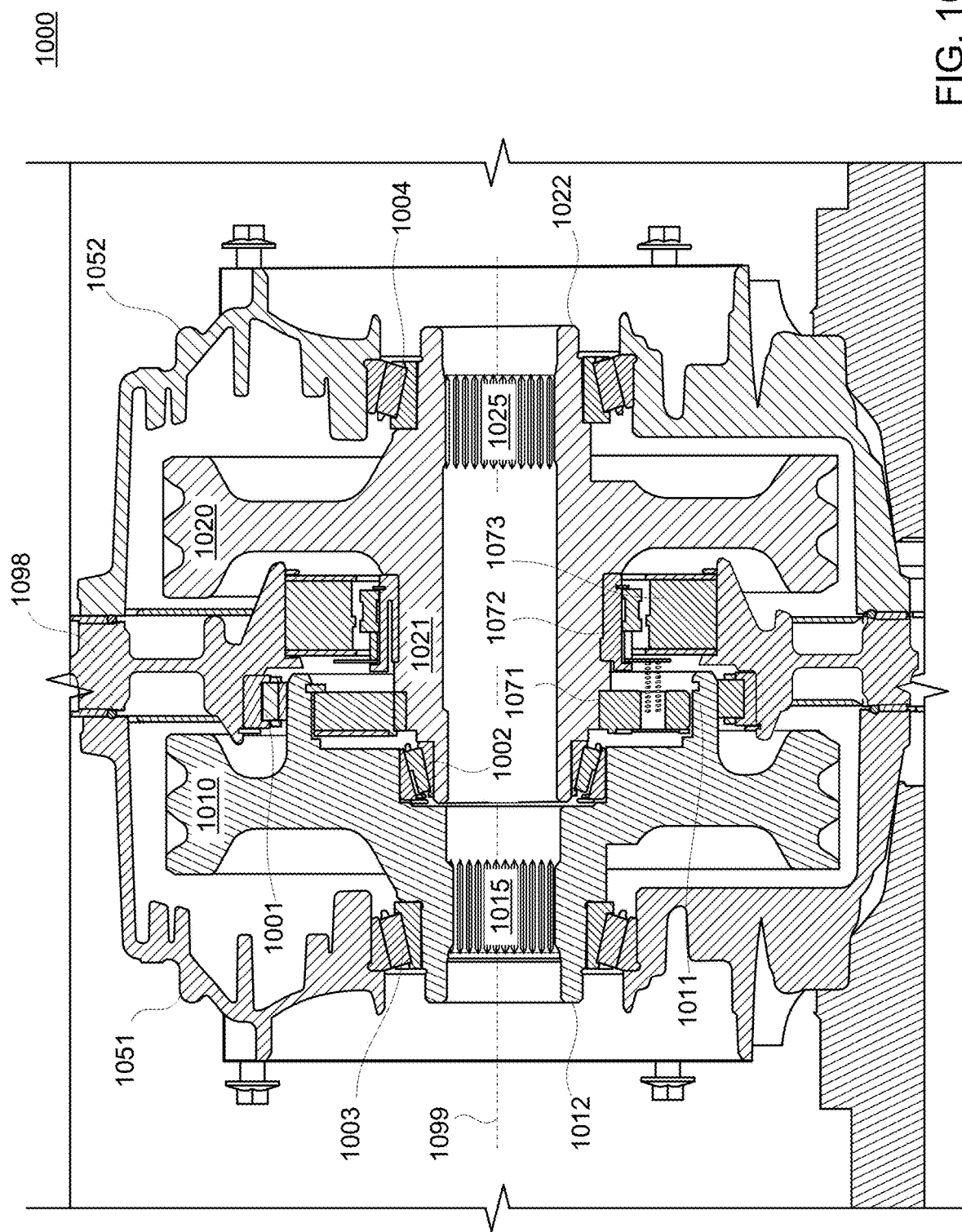
FIG. 10 shows a cross-sectional view of an illustrative drive system having nested drive gears, bearings, and a clutch assembly, in accordance with some embodiments of the present disclosure.

FIG. 10 shows a cross-sectional view of an illustrative drive system having nested drive gears, bearings, and a clutch assembly, in accordance with some embodiments of the present disclosure. Drive system 1000 is another illustrative example of arrangement 800 of FIG. 8, with a clutch assembly included. Drive system 1000 includes drive gear 1010 (e.g., having extensions 1011 and 1012), drive gear 1020 (e.g., having extensions 1021 and 1022), bearings 1001-1004, and a clutch assembly. Drive gear 1010 is driven by a first motor (e.g., in a similar arrangement as illustrated in FIGS. 2-3) and drive gear 1020 is driven by a second motor (e.g., in a similar arrangement as illustrated in FIGS. 2-3).

Drive gears 1010 and 1020 include toothed portions (e.g., which may be spur, helical, or any other suitable gear type), respectively, configured to engage with corresponding toothed portions of motor gears or intermediate gears. Drive gears 1010 and 1020 also include output interfaces 1015 and 1025 (e.g., splined recesses, as illustrated), respectively, configured to engage with splined half shafts.

Bearings 1001-1004 maintain alignment of drive gears 1010 and 1020 along axis 1099 during rotation and loading (e.g., axial loading, radial loading, and azimuthal loading). As illustrated, bearings 1002, 1003, and 1004 are tapered roller bearings, and bearing 1001 is a roller bearing. Bearing 1002 is configured to react both axial and radial forces between drive gear 1010 and drive gear 1020. Bearing 1001 is configured to react radial forces between drive gear 1010 and stationary component 1098. Extensions 1011 and 1021 may include one or more features to engage with bearing 1002 such as, for example, a step, splines, a keyway, any other suitable feature, or any combination thereof. For example, in some embodiments, an axial preload is applied to preload bearings 1002, 1003, and 1004 in the axial direction, and such features may aid in transmitting axial preload to bearing 1002. Bearings 1001, 1002, 1003, and 1004 each include races (e.g., inner and outer, which may include any suitable profile), a plurality of rollers, one or more spacers, shims, any other suitable components, or any suitable combination thereof. For example, as illustrated, a shim may be included to ensure axial loading of bearing 1002 (e.g., to accommodate any tolerance stack up to ensure bearing 1002 is constrained axially). In an illustrative example, during assembly, drive gears 1010 and 1020, and bearings 1001-1004 may be assembled, and a preload may be applied along axis 1099 to preload bearings 1002, 1003, and 1004 along axis 1099. To illustrate, because bearing 1002 engages with drive gears 1010 and 1020 and not stationary components, in some embodiments, a single axial preload may be applied to preload bearing 1002. As illustrated, bearing 901 is configured to react radial forces between drive gear 1010 and stationary component 1098. In some embodiments, drive system 1000 is arranged in an enclosure (e.g., formed by one or more housings that may include stationary component 1098), in which oil or other lubricant is supplied to reduce friction, provide cooling, or both, between relatively moving components.

The clutch assembly includes clutch element 1071, clutch element 1072, and actuator 1073 for engaging/disengaging the clutch. As illustrated, actuator 1073 is affixed to stationary component 1098 (e.g., an inward extension of an intermediate housing, as illustrated). Actuator 1073 is configured to linearly actuate clutch element 1072, which is affixed to drive gear 1020, thus causing clutch element 1072 to engage with clutch element 1071, which is affixed to drive gear 1010. When clutch elements 1071 and 1072 are engaged, drive gears 1010 and 1020 transmit torque to each other. For example, when the clutch assembly is not engaged, drive gears 1010 and 1020 are driven independently by respective motors, and may rotate relatively freely with respect to each other. Further, when the clutch assembly is engaged, drive gears 1010 and 1020 are constrained by friction forces to rotate at the same speed, or otherwise impart azimuthal forces (torque) on each other. Accordingly, when the clutch assembly is engaged, power from both drivers (e.g., electric motors) may be transmitted among the outputs (e.g., the wheels). For example, if one wheel has traction and the other wheel is slipping, engagement of the clutch assembly allows power to be directed to the wheel having traction. Clutch elements 1071 and 1072 may include friction plates, pressure plates, actuators (e.g., hydraulic, electromechanical, mechanical), centrifugal elements, conical elements, a torque limiter, dampers, springs (e.g., to reduce chatter, to release engagement), dog clutch elements (e.g., for non-slip engagement), any other suitable elements, or any combination thereof. As illustrated, for example, actuator 1073 engages the clutch assembly, with a stator of actuator 1073 affixed to stationary component 1098. In a further example, an engagement mechanism of the clutch assembly may be affixed to stationary component 1098 to provide a structure against which the engagement mechanism reacts a force.

Figure 11:
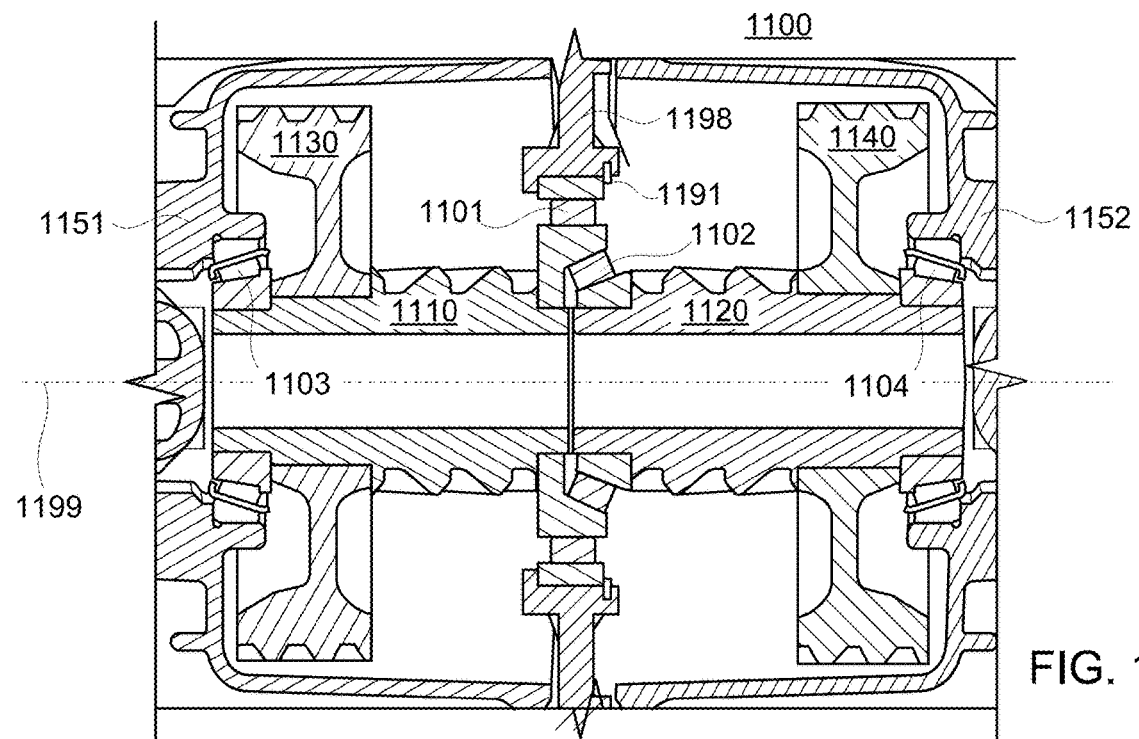
FIG. 11 shows a cross-sectional view of an illustrative bearing system for intermediate gears of a drive system, in accordance with some embodiments of the present disclosure.

FIG. 11 shows a cross-sectional view of illustrative bearing system 1100 for intermediate gears 1110 and 1120 of a drive system, in accordance with some embodiments of the present disclosure. Bearing system 1100 includes bearings 1101-1104 configured to maintain alignment of intermediate gear 1110 and intermediate gear 1120 (e.g., and also wheel gear 1130 and wheel gear 1140). Wheel gear 1130, which is rigidly affixed to intermediate gear 1110, is driven by a first motor (e.g., in a similar arrangement as illustrated in FIGS. 2-3). Wheel gear 1140, which is rigidly affixed to intermediate gear 1120, is driven by a second motor (e.g., in a similar arrangement as illustrated in FIGS. 2-3). To illustrate, intermediate gears 1110 and 1120 may engage with respective drive gears of the drive system.

Bearings 1101-1104 maintain alignment of intermediate gears 1110 and 1120 along axis 1199 during rotation and loading (e.g., axial loading, radial loading, and azimuthal loading). As illustrated, bearings 1102, 1103, and 1104 are tapered roller bearings, and bearing 1101 is a roller bearing.

Bearing 1102 is configured to react both axial and radial forces between intermediate gear 1110 and intermediate gear 1120. Bearing 1101 is configured to react radial forces between intermediate gears 1110 and 1120, and stationary component 1198. Intermediate gears 1110 and 1120 may include one or more features to engage with bearing 1102 such as, for example, a step (as illustrated), splines, a keyway, any other suitable feature, or any combination thereof. For example, in some embodiments, an axial preload is applied to preload bearings 1102, 1103, and 1104 in the axial direction, and such features may aid in transmitting axial preload to bearing 1102. Bearings 1101, 1102, 1103, and 1104 each include races (e.g., inner and outer, which may include any suitable profile), a plurality of rollers, one or more spacers, shims (e.g., such as shim 1191 configured to retain bearing 1101), any other suitable components, or any suitable combination thereof. As illustrated, bearings 1101 and 1102 share an intermediate structure that includes respective races for the bearings. Bearings 1101 and 1102 also include non-shared races. In an illustrative example, during assembly, intermediate gears 1110 and 1120, and bearings 1101-1104 may be assembled, and a preload may be applied along axis 1199 to preload bearings 1102, 1103, and 1104 along direction 1199. To illustrate, because bearing 1102 engages with intermediate gears 1110 and 1120 and not stationary components, in some embodiments, a single axial preload may be applied to preload bearing 1102. As illustrated, bearing 1101 is configured to react radial forces between intermediate gears 1110 and 1120, and stationary component 1198.

In some embodiments, bearing system 1100 is arranged in an enclosure (e.g., formed by one or more housings that may include stationary component 1198), in which oil or other lubricant is supplied to reduce friction, provide cooling, or both, between relatively moving components. For example, as illustrated, housing 1151, housing 1152, and stationary component 1198 (e.g., an intermediate housing) form the enclosure.

Figure 12:
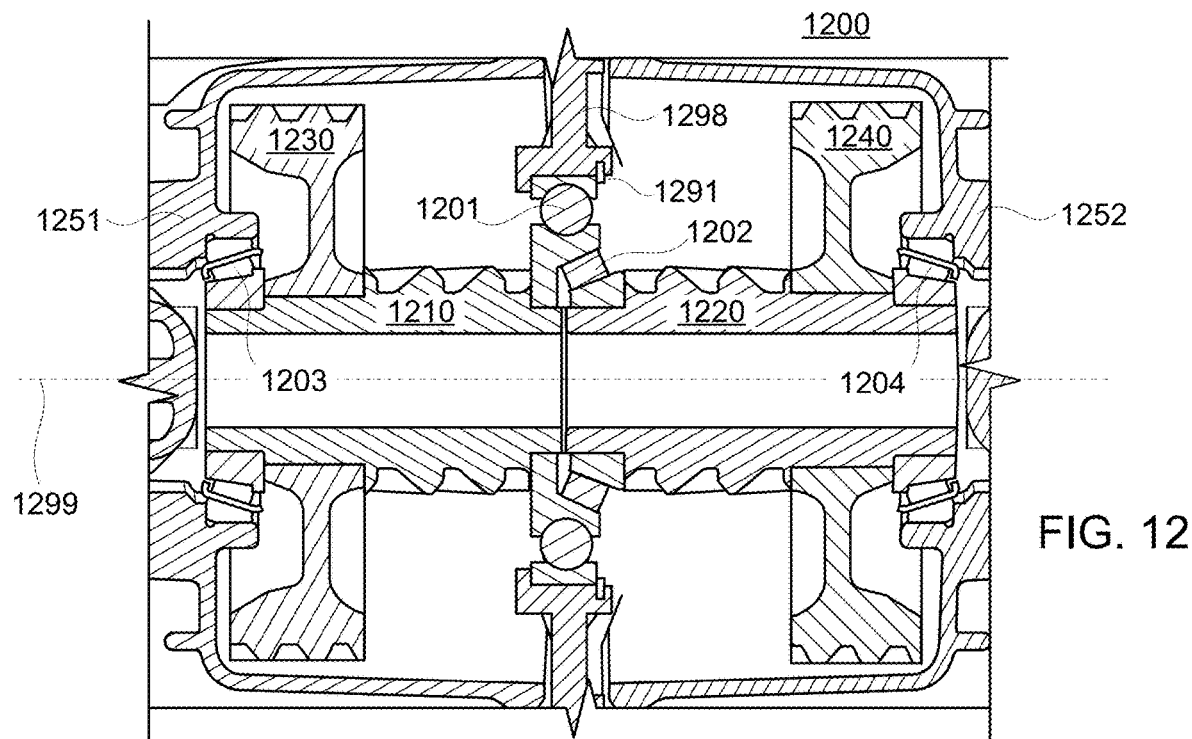
FIG. 12 shows a cross-sectional view of another illustrative bearing system for intermediate gears of a drive system, in accordance with some embodiments of the present disclosure.

FIG. 12 shows a cross-sectional view of illustrative bearing system 1200 for intermediate gears 1210 and 1220 of a drive system, in accordance with some embodiments of the present disclosure. Bearing system 1200 includes bearings 1201-1204 configured to maintain alignment of intermediate gear 1210 and intermediate gear 1220 (e.g., and also wheel gear 1230 and wheel gear 1240). Wheel gear 1230, which is rigidly affixed to intermediate gear 1210, is driven by a first motor (e.g., in a similar arrangement as illustrated in FIGS. 2-3). Wheel gear 1240, which is rigidly affixed to intermediate gear 1220, is driven by a second motor (e.g., in a similar arrangement as illustrated in FIGS. 2-3). To illustrate, intermediate gears 1210 and 1220 may engage with respective drive gears of the drive system.

Bearings 1201-1204 maintain alignment of intermediate gears 1210 and 1220 along axis 1299 during rotation and loading (e.g., axial loading, radial loading, and azimuthal loading). As illustrated, bearings 1202, 1203, and 1204 are tapered roller bearings, and bearing 1201 is a ball bearing. Bearing 1202 is configured to react both axial and radial forces between intermediate gear 1210 and intermediate gear 1220. Bearing 1201 is configured to react radial forces between intermediate gears 1210 and 1220, and stationary component 1298. Intermediate gears 1210 and 1220 may include one or more features to engage with bearing 1202 such as, for example, a step (as illustrated), splines, a keyway, any other suitable feature, or any combination thereof. For example, in some embodiments, an axial preload is applied to preload bearings 1202, 1203, and 1204 in the axial direction, and such features may aid in transmitting axial preload to bearing 1202. Bearings 1201, 1202, 1203, and 1204 each include races (e.g., inner and outer, which may include any suitable profile), a plurality of rollers, one or more spacers, shims (e.g., such as shim 1291 configured to retain bearing 1201), any other suitable components, or any suitable combination thereof. As illustrated, bearings 1201 and 1202 share an intermediate structure that includes respective races for the bearings. Bearings 1201 and 1202 also include non-shared races. In an illustrative example, during assembly, intermediate gears 1210 and 1220, and bearings 1201-1204 may be assembled, and a preload may be applied along axis 1299 to preload bearings 1202, 1203, and 1204 along direction 1299. To illustrate, because bearing 1202 engages with intermediate gears 1210 and 1220 and not stationary components, in some embodiments, a single axial preload may be applied to preload bearing 1202. As illustrated, bearing 1201 is configured to react radial forces between intermediate gears 1210 and 1220, and stationary component 1298.

In some embodiments, bearing system 1200 is arranged in an enclosure (e.g., formed by one or more housings that may include stationary component 1298), in which oil or other lubricant is supplied to reduce friction, provide cooling, or both, between relatively moving components. For example, as illustrated, housing 1251, housing 1252, and stationary component (e.g., an intermediate housing) form the enclosure.

Figure 13:
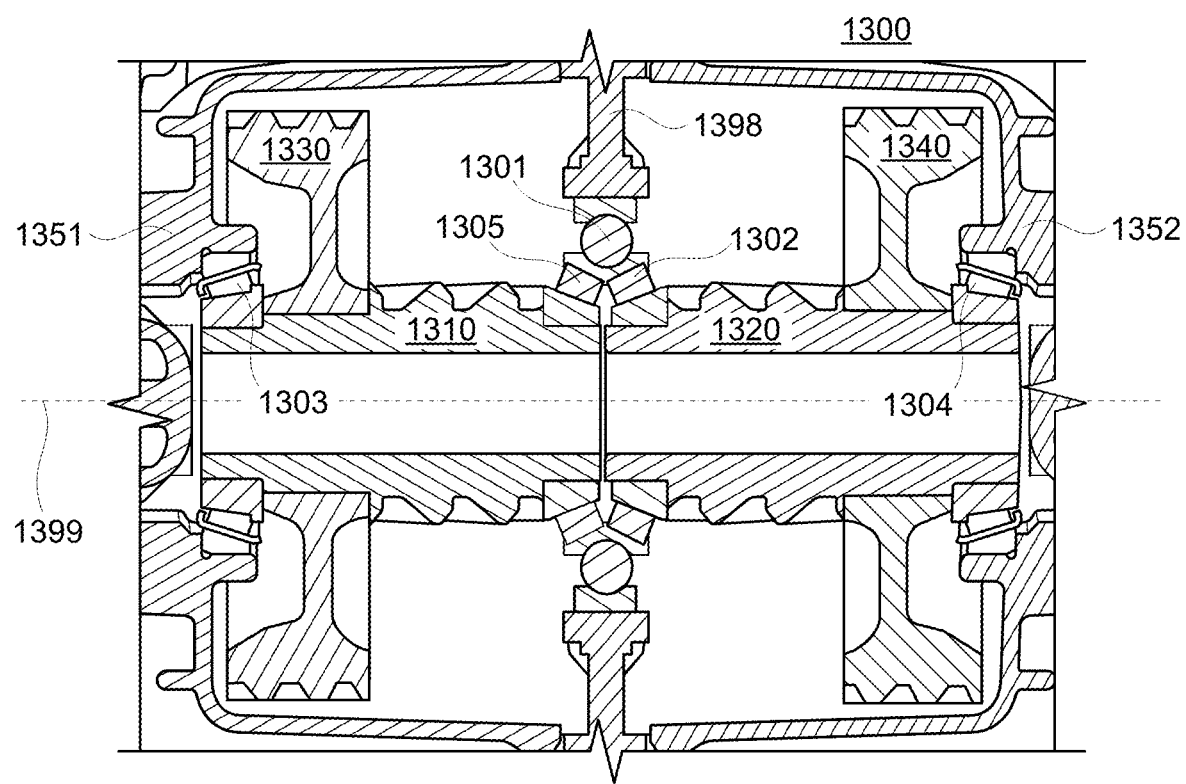
FIG. 13 shows a cross-sectional view of another illustrative bearing system for intermediate gears of a drive system, in accordance with some embodiments of the present disclosure.

FIG. 13 shows a cross-sectional view of illustrative bearing system 1300 for intermediate gears 1310 and 1320 of a drive system, in accordance with some embodiments of the present disclosure. Bearing system 1300 includes bearings 1301-1305 configured to maintain alignment of intermediate gear 1310 and intermediate gear 1320 (e.g., and also wheel gear 1330 and wheel gear 1340). Wheel gear 1330, which is rigidly affixed to intermediate gear 1310, is driven by a first motor (e.g., in a similar arrangement as illustrated in FIGS. 2-3). Wheel gear 1340, which is rigidly affixed to intermediate gear 1320, is driven by a second motor (e.g., in a similar arrangement as illustrated in FIGS. 2-3). To illustrate, intermediate gears 1310 and 1320 may engage with respective drive gears of the drive system.

Bearings 1301-1305 maintain alignment of intermediate gears 1310 and 1320 along axis 1399 during rotation and loading (e.g., axial loading, radial loading, and azimuthal loading). As illustrated, bearings 1302, 1303, 1304, and 1305 are tapered roller bearings, and bearing 1301 is a ball bearing. Bearings 1302 and 1305 are configured to react both axial and radial forces between intermediate gear 1310 and intermediate gear 1320. Bearing 1301 is configured to react radial forces between intermediate gears 1310 and 1320, and stationary component 1398. Intermediate gears 1310 and 1320 may include one or more features to engage with bearing 1302 such as, for example, a step (as illustrated), splines, a keyway, any other suitable feature, or any combination thereof. For example, in some embodiments, an axial preload is applied to preload bearings 1302, 1305, 1303, and 1304 in the axial direction, and such features may aid in transmitting axial preload to bearings 1302 and 1305. Bearings 1301, 1302, 1303, 1304, and 1305 each include races (e.g., inner and outer, which may include any suitable profile), a plurality of rollers, one or more spacers, shims, any other suitable components, or any suitable combination thereof. As illustrated, bearings 1301, 1302, and 1305 share an intermediate structure that includes respective races for the bearings. Bearings 1301, 1302, and 1305 also include non-shared races. In an illustrative example, during assembly, intermediate gears 1310 and 1320, and bearings 1301-1305 may be assembled, and a preload may be applied along axis 1399 to preload bearings 1302, 1303, 1304, and 1305 along direction 1399. To illustrate, because bearings 1302 and 1305 engages with intermediate gears 1310 and 1320 and not stationary components, in some embodiments, a single axial preload may be applied to preload bearings 1302 and 1305. As illustrated, bearing 1301 is configured to react radial forces between intermediate gears 1310 and 1320, and stationary component 1398.

In some embodiments, bearing system 1300 is arranged in an enclosure (e.g., formed by one or more housings that may include stationary component 1398), in which oil or other lubricant is supplied to reduce friction, provide cooling, or both, between relatively moving components. For example, as illustrated, housing 1351, housing 1352, and stationary component (e.g., an intermediate housing) form the enclosure.

Figure 14:
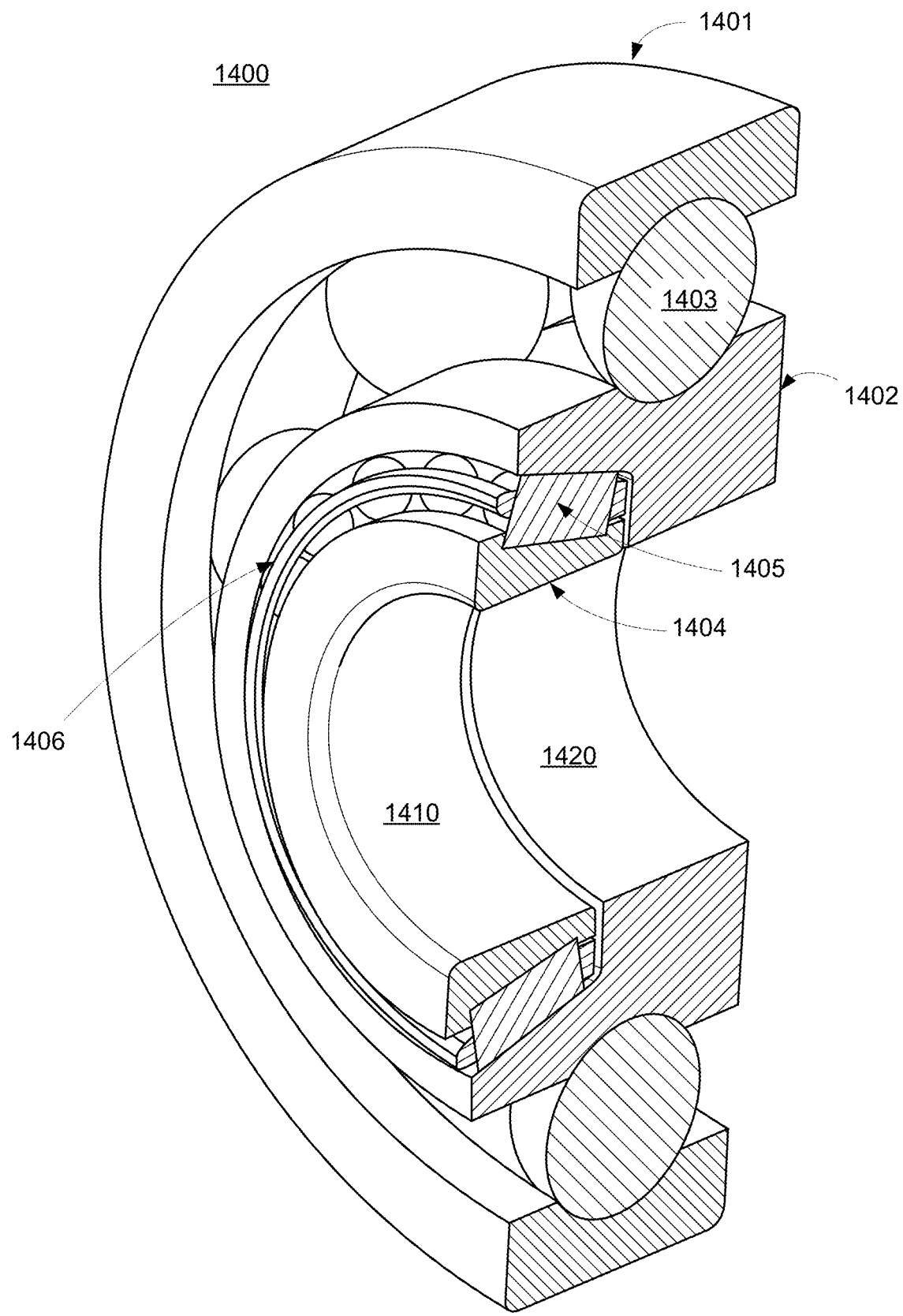
FIG. 14 shows a cross-sectional perspective view of an illustrative bearing assembly, in accordance with some embodiments of the present disclosure.

FIG. 14 shows a cross-sectional perspective view of illustrative bearing assembly 1400, in accordance with some embodiments of the present disclosure. As illustrated, bearing assembly 1400 includes element 1401, element 1402, element 1404, ball rollers 1403, rollers 1405, spacer 1406, surface 1410, and surface 1420. Ball rollers 1403 are configured to roll between element 1401 (e.g., which includes an outer race having a curved groove extending azimuthally around the bearing to accommodate ball rollers 1403, as illustrated) and element 1402 (e.g., which includes an inner race having a curved groove extending azimuthally around the bearing to accommodate ball rollers 1403, as illustrated). For example, ball rollers 1403 are part of a ball bearing. Rollers 1405 are configured to roll between element 1402 (e.g., which includes an outer race for rollers 1405) and element 1404 (e.g., which includes an inner race for rollers 1405), with spacer 1406 constraining the spacing and trajectory of rollers 1405. For example, rollers 1405 are part of a tapered roller bearing. In an illustrative example, a bearing assembly such as bearing assembly 1400 is included in bearing system 1200 of FIG. 12 as bearings 1201 and 1202. The tapered roller bearing is configured to react axial and radial loads. The ball bearing is configured to react radial loads and to a lesser extent axial loads. Element 1404 includes surface 1410 for interfacing to a shaft (e.g., of an intermediate gear or any other suitable gear). Element 1402 includes surface 1420 for interfacing to, for example, an opposing shaft (e.g., of an intermediate gear or any other suitable gear).

In an illustrative example, the drivetrains of the present disclosure may be combined or otherwise modified in accordance with the present disclosure. For example, one or more components may be added to a drivetrain (e.g., a clutch, a bearing, an extension), removed from a drivetrain, or combined with components of other embodiments.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A drivetrain system comprising:
a first drive gear arranged on an axis and driven by a first motor, wherein the first drive gear comprises:
a first extension along the axis; and
a third extension radially within the first extension;
a second drive gear arranged on the axis, wherein the second drive gear is driven by a second motor, wherein the second drive gear comprises a second extension along the axis, and wherein the second extension is arranged radially within and axially overlaps the first extension, and wherein the third extension is radially within and axially overlaps the second extension;
a first bearing arranged between the first extension and to the second extension; and
a second bearing arranged between the second extension and the third extension.

2. The drivetrain system of claim 1, wherein the first bearing comprises a taper roller bearing for transmitting axial force between the first drive gear and the second drive gear.

3. The drivetrain system of claim 1, wherein the second bearing comprises a roller bearing.

4. The drivetrain system of claim 1, wherein the first drive gear comprises a fourth extension extending axially opposite of the first extension, and wherein the second drive gear comprises a fifth extension extending axially opposite of the second extension, the drivetrain system further comprising:
a third bearing engaged with the fourth extension; and
a fourth bearing engaged with the fifth extension.

5. The drivetrain system of claim 1, wherein the third extension comprises a recess for holding lubricating grease.

6. The drivetrain system of claim 5, further comprising an O-ring arranged between the third extension and the second extension to at least partially seal the recess.

7. The drivetrain system of claim 1, wherein the first bearing and the second bearing experience a relative rotation between the first drive gear and the second drive gear.

\* \* \* \* \*